US012649484B2

(12) United States Patent
Toyoda et al.

(10) Patent No.: US 12,649,484 B2
(45) Date of Patent: Jun. 9, 2026

(54) VEHICLE CONTROL DEVICE, VEHICLE CONTROL METHOD, AND STORAGE MEDIUM

(71) Applicant: TOYOTA JIDOSHA KABUSHIKI KAISHA, Toyota (JP)

(72) Inventors: Hiroshi Toyoda, Numazu (JP); Shinya Kawamata, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/741,770

(22) Filed: Jun. 13, 2024

(65) Prior Publication Data

US 2025/0100573 A1      Mar. 27, 2025

(30) Foreign Application Priority Data

Sep. 22, 2023     (JP) ................................. 2023-157452

(51) Int. Cl.
| | |
|---|---|
| *B60W 50/14* | (2020.01) |
| *B60T 7/12* | (2006.01) |
| *B62D 15/02* | (2006.01) |
| *G06F 3/02* | (2006.01) |

(52) U.S. Cl.
CPC ............... *B60W 50/14* (2013.01); *B60T 7/12* (2013.01); *B62D 15/025* (2013.01); *G06F 3/02* (2013.01)

(58) Field of Classification Search
CPC ........................... B62D 15/025; B60W 50/082
See application file for complete search history.

(56) References Cited

U.S. PATENT DOCUMENTS

| | | | | |
|---|---|---|---|---|
| 9,964,950 | B2 | 5/2018 | Takano | |
| 10,017,116 | B2 | 7/2018 | Sato | |
| 10,310,508 | B2 | 6/2019 | Kunisa et al. | |
| 10,452,930 | B2 | 10/2019 | Sato | |
| 10,663,973 | B2 | 5/2020 | Hashimoto et al. | |
| 10,895,875 | B2 | 1/2021 | Hashimoto et al. | |
| 11,001,198 | B2 | 5/2021 | Morimura et al. | |
| 11,275,382 | B2 | 3/2022 | Hashimoto et al. | |
| 11,392,270 | B2 * | 7/2022 | Takahashi | B60K 35/28 |
| 2016/0129836 | A1 * | 5/2016 | Sugita | G08G 1/163 |
| | | | | 701/41 |
| 2019/0270458 | A1 | 9/2019 | Shimotani et al. | |
| 2019/0337533 | A1 * | 11/2019 | Kume | B60W 30/0956 |
| 2020/0047746 | A1 * | 2/2020 | Ji | B60W 10/18 |
| 2021/0229598 | A1 | 7/2021 | Morimura et al. | |

(Continued)

FOREIGN PATENT DOCUMENTS

| | | |
|---|---|---|
| JP | 2018-149915 A | 9/2018 |
| JP | 2022-083797 A | 6/2022 |
| WO | 2018/066026 A1 | 4/2018 |

*Primary Examiner* — Long T Tran
(74) *Attorney, Agent, or Firm* — SoraIP, Inc.

(57) ABSTRACT

The vehicle control device performs a process of controlling the notification device so that the information on the specific driving assist is provided to the driver in a predetermined period after the time point at which the control of the own vehicle is started so that the specific driving assist among the plurality of types of driving assist is provided to the driver, and/or a process of changing a value assigned to a parameter as setting information of a function for providing the specific driving assist when the driver performs a predetermined operation within the predetermined period.

2 Claims, 3 Drawing Sheets

(56) References Cited

U.S. PATENT DOCUMENTS

| | | | |
|---|---|---|---|
| 2021/0380124 A1 | 12/2021 | Urano et al. | |
| 2023/0234604 A1* | 7/2023 | Nguyen | B60W 50/16 |
| 2024/0025437 A1* | 1/2024 | Sadakuni | B60K 35/21 |
| 2024/0166227 A1* | 5/2024 | Kitamura | B60W 50/0098 |
| 2024/0174245 A1* | 5/2024 | Doi | B60W 50/087 |
| 2024/0227838 A1* | 7/2024 | Iwasaki | B60W 50/14 |

* cited by examiner

VEHICLE CONTROL DEVICE, VEHICLE CONTROL METHOD, AND STORAGE MEDIUM

CROSS-REFERENCE TO RELATED APPLICATION

This application claims priority to Japanese Patent Application No. 2023-157452 filed on Sep. 22, 2023, incorporated herein by reference in its entirety.

BACKGROUND

1. Technical Field

The present disclosure relates to a vehicle control device, a vehicle control method, and a storage medium that control a host vehicle such that a driver is provided with predetermined driving assist for assisting the driver in performing a driving operation when a predetermined condition is met.

2. Description of Related Art

There has been proposed a vehicle control device that includes a driving assist function of controlling the host vehicle such that a driver is provided with predetermined driving assist for assisting the driver in performing a driving operation when a predetermined condition is met (see Japanese Unexamined Patent Application Publication No. 2022-083797 (JP 2022-083797 A), for example). This vehicle control device (hereinafter referred to as a "conventional device") includes a multiplicity of (a plurality of types of) driving assist functions. The conventional device includes, as a driving assist function, an automatic braking function of automatically braking the host vehicle when the host vehicle suddenly approaches the preceding vehicle, for example. The conventional device includes, as another driving assist function, an automatic steering function of automatically steering the host vehicle so as to be positioned at the center portion, in the width direction, of a lane in which the host vehicle is traveling when there is a high possibility that the host vehicle deviates from the lane.

SUMMARY

Meanwhile, there has been proposed a vehicle control device of this type, configured such that a condition for starting to provide driving assist and a mode of the driving assist (setting information for the driving assist function) are customizable (adjustable) according to the preference of the driver. In this case, an image to be used to customize the driving assist function is displayed on a display device, for example. This image includes an image that represents the name (abbreviated name) of the driving assist function, a value (present value) assigned to a parameter related to whether the condition is met, and a value (present value) assigned to a parameter related to the mode of the driving assist. Then, the driver can change the values assigned to the various parameters (customize a specific driving assist function) by operating an operation device (such as a push-button switch and a touch panel, for example) mounted on the host vehicle. Hereinafter, this function will be referred to as a "conventional customization function". In general, the customization can be executed in a state in which the host vehicle is stationary (e.g., during a period since a time point when an ignition switch transitions to the ON state until the host vehicle starts to travel).

Here, when the vehicle control device includes a multiplicity of driving assist functions, when the customization is started, a list of names (abbreviated names including initial letters (alphabets) in the English language) of the driving assist functions is first displayed on the display device. When the driver operates the operation device to select (designate) a driving assist function desired to be customized, the image (list) displayed on the display device is switched to an image to be used to customize the selected driving assist function. In general, it is rare for the driver to be familiar with the names of all the driving assist functions, their contents (effects obtained by the driving assist functions), procedures for customizing the driving assist functions, and the like. Most drivers customize the driving assist functions while referencing an instruction manual. In this manner, it is relatively difficult to customize the driving assist functions.

An object of the present disclosure is to provide a vehicle control device that allows a driver to easily customize a specific driving assist function.

In order to address the above issue, an aspect of the present disclosure provides a vehicle control device (1) including a processor (10) having a driving assist function (DAFn) of controlling a host vehicle such that predetermined driving assist (DAn) is provided to a driver of the host vehicle when a predetermined condition (Xn) is met.

The processor is configured to execute either or both of:

a process of controlling a notification device (30) such that information (Gn) related to specific driving assist, among a plurality of types of driving assist, is provided to the driver in a predetermined period (Tn) at and after a time point (t0) at which control of the host vehicle is started such that the specific driving assist is provided to the driver; and a process of changing a value assigned to a parameter (TTCth, TTDth, BFd, STd) as setting information for a function of providing the specific driving assist when the driver performs a predetermined operation within the predetermined period.

In a predetermined period after the provision of the driving assist is started by the driving assist function of the vehicle control device according to the present disclosure, information related to the driving assist function (such as the name (abbreviated name), content, and customization procedure of the driving assist function, for example) is provided to the driver. Therefore, the driver can acquire (recognize) information related to the driving assist without referencing an instruction manual. This makes it easier for the driver to make use of the conventional customization function. Further, with the conventional device, as described above, the driver needs to designate a driving assist function to be customized. On the contrary, with the vehicle control device according to the present disclosure, a driving assist function (driving assist provided immediately before) is selected as the customization target during a predetermined period after the provision of the driving assist (the control of the host vehicle) is started by the driving assist function. After that, the driving assist function can be customized by the driver performing a predetermined operation within the predetermined period. With the vehicle control device according to the present disclosure, the driver can easily customize a specific driving assist function in the manner described above.

In the vehicle control device according to an aspect of the present disclosure, the parameter may include a first parameter related to whether a condition for starting to provide the specific driving assist is met and a second parameter related to a mode of the specific driving assist.

According to this configuration, the driver can easily customize the condition (sensitivity) for starting to provide the specific driving assist and the mode (intensity) of the driving assist.

In the vehicle control device according to another aspect of the present disclosure, the processor may collectively change values assigned to the first parameter (TTCth, TTDth) and the second parameter (BFd, STd) when the driver performs the predetermined operation within the predetermined period.

According to this configuration, the driver can collectively customize the condition (sensitivity) for starting to provide the specific driving assist and the mode (intensity) of the specific driving assist by executing a single operation.

Further, the vehicle control method and the storage medium according to aspects of the present disclosure include steps (processes) executed by a device that constitutes the above vehicle control device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Overview

A vehicle control device 1 according to an embodiment of the present disclosure is mounted on a vehicle V (host vehicle) having an automatic driving function. A predetermined condition Xn (n=1, 2, . . . ) may be established in a situation where the autonomous driving function is disabled (a situation where the driver voluntarily performs driving operations). In this case, the vehicle control device 1 includes a driving assist function DAFn (n=1, 2, . . . ) that controls the own vehicle so that driving assist DAn (n=1, 2, . . . ) that assists the driver in driving is provided. Further, the vehicle control device 1 has an information providing function of displaying information (an abbreviated name and setting information (values assigned to various parameters)) related to the driving assist DAn in a predetermined period Tn from the time point when one driving assist DAn is provided. In addition, the vehicle control device 1 has a simple customization function of changing the degree (strength) of the driving assist DAn and the condition Xn (sensitivity) for starting the provision of the driving assist DAn in accordance with the mode of the operation when the driver performs a predetermined operation within the period Tn.

Specific Configuration

Figure 1:
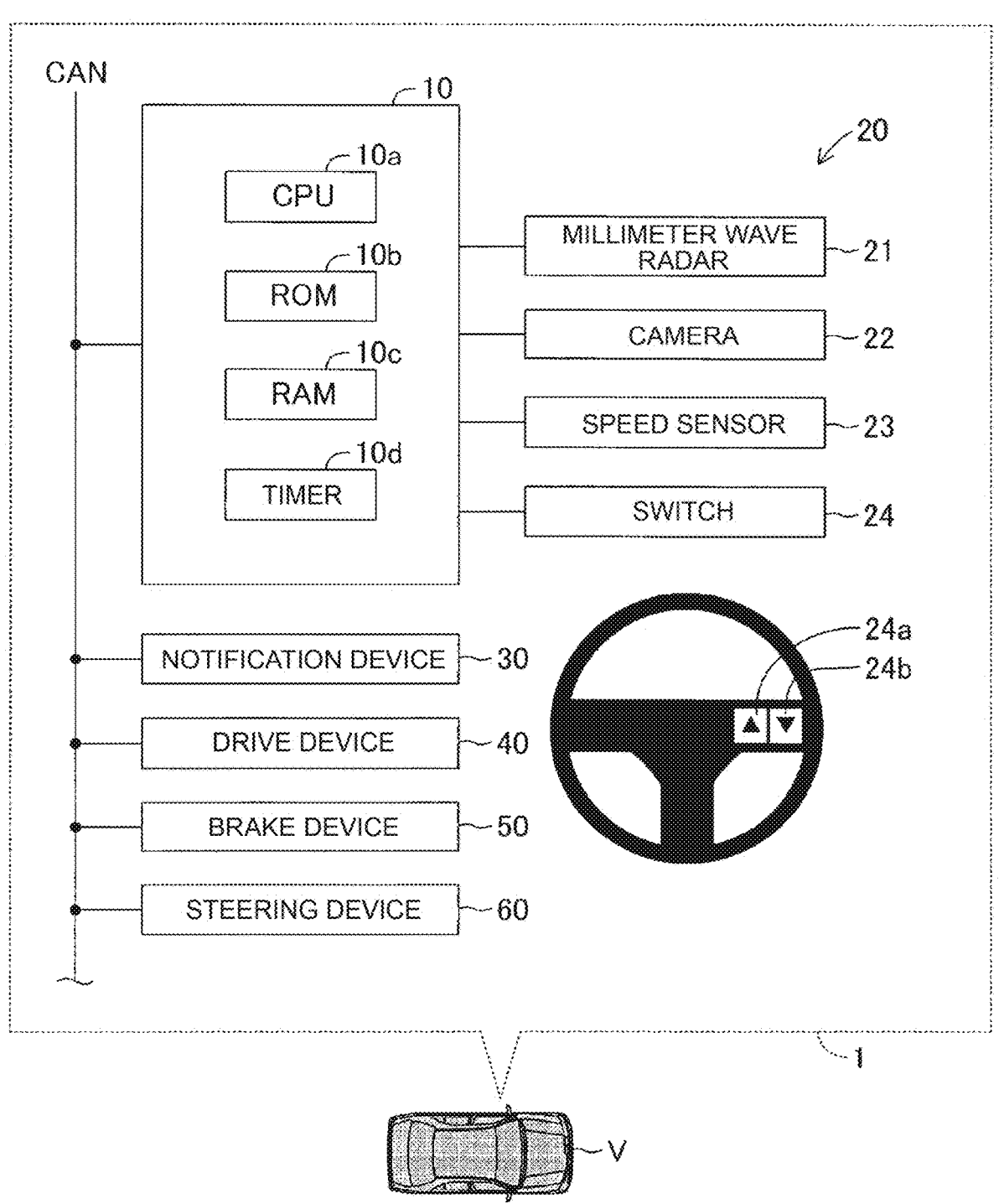
FIG. 1 is a block diagram of a vehicle control device according to an embodiment of the present disclosure.

As illustrated in FIG. 1, the vehicle control device 1 includes a ECU 10, an in-vehicle sensor 20, a notification device 30, a drive device 40, a braking device 50, and a steering device 60.

ECU 10 includes a microcomputer including a CPU 10a, ROM 10b (flash ROM), a RAM 10c, a timer 10d, and the like. Each of the ROM 10b (flash ROM) and the RAM 10c is an example of a non-transitory storage medium. ECU 10 is connected to another ECU included in the host vehicle via a CAN (Controller Area Network).

The in-vehicle sensor 20 includes a millimeter wave radar 21, a camera 22, a speed sensor 23, and a switch 24.

The millimeter wave radar 21 includes a transmission/reception unit and a signal processing unit. The transmission and reception unit radiates a millimeter-wave band radio wave (hereinafter, referred to as "millimeter wave") toward the front of the own vehicle, and receives a millimeter wave (reflected wave) reflected by a three-dimensional object (such as a preceding vehicle) located within a radiation range. The signal processing unit calculates the distance between the host vehicle and the three-dimensional object, the speed of the three-dimensional object, and the like on the basis of the time from the emission of the millimeter wave by the transmitting/receiving unit until the reception of the reflected wave, the phase difference between the transmitted millimeter wave and the received reflected wave, the attenuation level of the reflected wave, and the like. The signal-processing unit transmits the calculation result to ECU 10.

The camera 22 includes an imaging device and an image analysis device. The imaging device is, for example, a digital camera incorporating an imaging device made of CCD (charge coupled device). The imaging device is assembled to, for example, a front portion of the vehicle cabin. The imaging device is directed forward. The imaging device captures a predetermined region in front of the host vehicle at a predetermined frame rate, and acquires image data. The imaging device provides the image data to the image analysis device. The image analysis device can analyze the acquired image data to identify the type of the object (preceding vehicle, pedestrian, etc.) located in front of the host vehicle. Further, the image analysis device acquires (calculates) information on the behavior of the preceding vehicle located in front of the host vehicle based on the change of the image (time-series data including a plurality of pieces of image data). For example, the image analysis device acquires (calculates) the speed (relative speed) of the preceding vehicle with respect to the host vehicle on the basis of a change in the position, size, or the like of the license plate of the preceding vehicle within the angle of view. The image-analysis device transmits the above-described calculation result to ECU 10.

The speed sensor 23 detects the rotational speed (wheel speed) of each wheel of the host vehicle, and calculates the speed (behavior of the host vehicle) of the host vehicle based on the wheel speed of each wheel. The speed sensor 23 transmits the speed of the host vehicle to ECU 10.

As will be described in detail later, the switch 24 includes a push-button type switch 24a, 24b used in customizing the driving assist function DAFn. The switch 24a, 24b is integrated into the spoked portion of the steering wheel. The driver can press the switch 24a or the switch 24b while operating the steering wheel. ECU 10 monitors the on/off status of the switch 24.

The notification device 30 includes an image display device and an acoustic device. The image display device and the sound device are incorporated in, for example, an instrument panel of the host vehicle. The image display device displays an image in accordance with an image display command acquired from ECU 10. In addition, the sound device reproduces the sound in accordance with the sound reproduction command acquired from ECU 10.

The drive device 40 generates a driving force and applies the driving force to the driving wheels of the wheels (left front wheels, right front wheels, left rear wheels, and right rear wheels). The drive device 40 includes an engine ECU, an internal combustion engine, a transmission, and the like. The engine ECU obtains a target driving force from ECU 10. The engine ECU controls the throttle valve (the opening degree of the solenoid valve) of the internal combustion engine so that the driving force applied to the drive wheels matches the target value. The output (driving force) of the internal combustion engine is transmitted to the drive wheels via a transmission and a driving force transmission mechanism (for example, a drive shaft).

When the host vehicle is hybrid electric vehicle (HEV), the engine ECU causes the driving force generated by one or both of the "internal combustion engine and the electric motor" as the vehicle driving source to coincide with the target value. When the host vehicle is an electric vehicle (BEV), an electric motor ECU may be used instead of the engine ECU. The motor ECU matches a driving force generated by an "electric motor" as a driving source to a target value.

The braking device 50 applies a braking force to the wheels. The braking device 50 includes a brake ECU, hydraulic circuitry, and a brake caliper. The hydraulic circuit includes a reservoir (not shown), an oil pump, various valve devices, a hydraulic sensor, and the like. The brake caliper is a hydraulic actuator with a cylinder and a piston. When oil is supplied to the cylinder, a piston is pushed out of the cylinder. A brake pad is provided at the tip of the piston, and this brake pad is pressed against a brake disc. The brake ECU obtains a target value of the braking force from ECU 10. The brake ECU controls the hydraulic circuitry such that the braking force applied to the wheels matches the target value.

The steering device 60 adjusts the steering angle of the steering wheels (the left front wheel and the right front wheel). The steering device 60 includes a steering ECU and steering mechanisms (steering wheels, rods, and the like). The steering device 60 further includes an actuator (for example, an electric motor) that drives the steering mechanism to change the steering angle, and a steering angle sensor that acquires the steering angle (actual steering angle) of the steering wheel. The steering ECU acquires a target value of the steering angle from ECU 10, and controls the actuator so that the actual steering angle outputted from the steering angle sensor matches the target value.

Driving Assist Function

The vehicle control device 1 includes a plurality of types of driving assist function DAFn (n=1, 2, . . . ). ECU 10 sequentially determines whether or not the condition Xn for starting the provision of the driving assist DAn is successful. When the condition Xn is satisfied, ECU 10 starts providing the driving assist DAn. For example, the vehicle control device 1 includes, as the driving assist function DAF1, an automated braking function (PCS=Pre-Crash Safety system) that automatically brakes the host vehicle when the host vehicle suddenly approaches an obstacle (preceding vehicle). Specifically, ECU 10 calculates (predicts) a time TTC required for the host vehicle to touch an obstacle based on various types of information acquired from the in-vehicle sensor 20. When the time TTC is equal to or less than the threshold TTCth, it is determined that the condition X1 is satisfied. Then, ECU 10 controls the braking device 50 so that the braking force BF applied to the wheels of the host vehicle matches the preset target value BFd.

Further, for example, the vehicle control device 1 includes, as the driving assist function DAF2, an auto-steering function (LDA=Lane Departure Alert) that steers the host vehicle so as to be positioned at the center portion of the lane in the widthwise direction when there is a high possibility that the vehicle deviates from the lane in which the host vehicle is traveling. Specifically, ECU 10 calculates the velocity vector vy in the lateral direction of the host vehicle (in the widthwise direction of the lane in which the host vehicle is traveling) based on various pieces of information acquired from the in-vehicle sensor 20. ECU 10 calculates (predicts) TTD of times it takes for the host vehicle to deviate from the lane based on the direction and magnitude of the velocity vector vy and the position of the host vehicle in the width direction of the lane in which the host vehicle is traveling. ECU 10 determines that the condition X2 is satisfied when the time TTD is equal to or less than the threshold TTDth. Then, ECU 10 controls the steering device 60 so that the steering torque ST in the direction opposite to the direction of the velocity vector vy is applied to the steering wheel and the magnitude thereof matches the target value STd.

Further, the vehicle control device 1 has a function of notifying that the preceding vehicle has started, a function of notifying that there is a vehicle approaching from the left side or the right side when the host vehicle enters the intersection, and the like as a driving assist function. Further, the vehicle control device 1 includes an automated braking function (PDA=Proactive Driving Assist) as a driving assist function. In the automatic braking function, when the interruption of the preceding vehicle or the adjacent vehicle is detected and it is detected that the depression depth of the accelerator pedal becomes "0", the subject vehicle is slowly decelerated so that the distance between the preceding vehicle or the adjacent person and the subject vehicle is maintained at a threshold value or more.

Information Service Function

Figure 2:
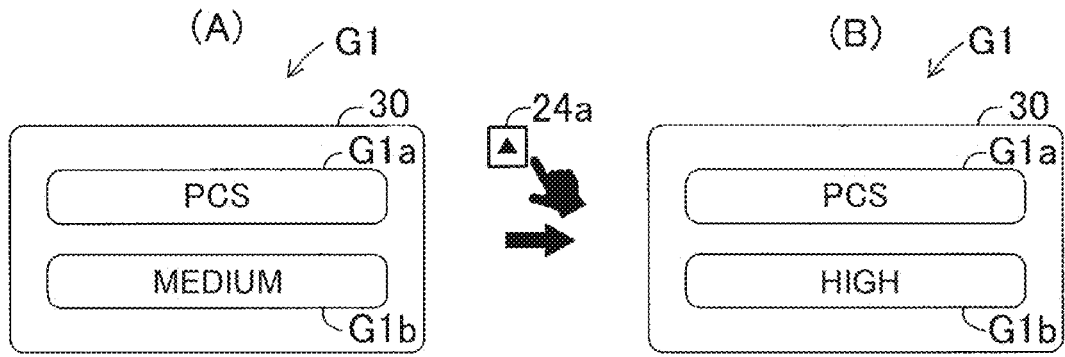
FIG. 2 is a first example of an image displayed as information related to driving assistance provided to a driver.
Figure 3:
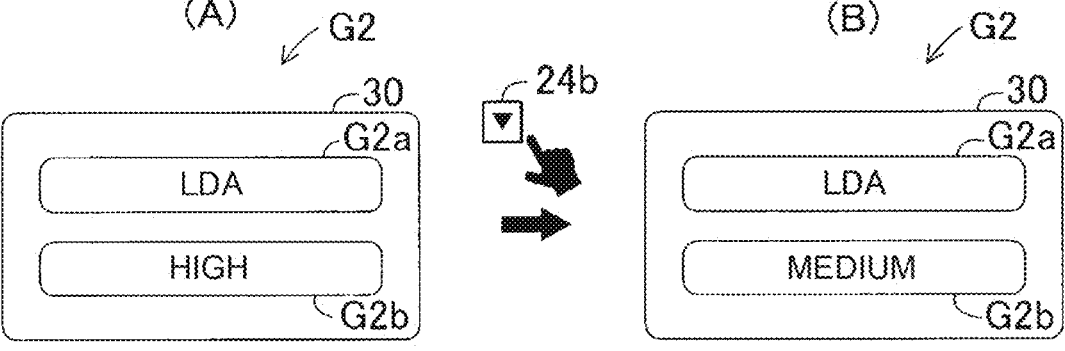
FIG. 3 is a second illustration of images displayed as information about driving assistance provided to a driver.

ECU 10 starts providing the driving assist DAn, and at the same time, causes the notification device 30 to display the image Gn representing the abbreviated name of the driving assist DAn and the setting information related to the driving assist DAn (see FIGS. 2 and 3). The setting information includes, for example, information indicating the degree (strength) of the driving assist DAn and the ease (sensitivity) of establishment of the condition Xn for starting the provision of the driving assist DAn. In the present embodiment, "sensitivity and intensity" are classified into three levels ("high", "medium", and "low"). However, the "sensitivity and intensity" may be divided into more levels. Also, the lowest level of "sensitivity" and/or "intensity" may be "0". That is, the driving assist function DAFn may be set to the off-state. In the present embodiment, the level of "sensitivity" and the level of "intensity" are the same.

Referring to FIGS. 2 and 3, a specific embodiment of the image Gn will be described. When it is determined that the condition X1 is satisfied, ECU 10 starts providing the driving assist DA1 (auto-braking) and simultaneously displays G1 (FIG. 2) on the notification device 30. The image G1 includes an image (text) G1a representing "PCS" which is an abbreviation of the function. The image G1 also includes image G1b representing the present setpoint of "Sensitivity and Intensity." In this case, the "sensitivity" corresponds to the threshold TTCth of the time TTC, and the "strength" corresponds to the target value BFd of the braking force BF by the auto-braking. In the example illustrated in (A) of FIG. 2, "sensitivity and intensity" are "medium". That is, a moderate value is assigned to the threshold TTCth (first parameter) and the target value BFd (second parameter) as "sensitivity and intensity".

When it is determined that the condition X2 is satisfied, ECU 10 starts providing the driving assist DA2 (autopilot) and causes the notification device 30 to display the image G2 (FIG. 3). The image G2 includes an image (text) G2a representing "LDA" which is an abbreviation of the function. The image G2 also includes image G2b representing the present setpoint of "Sensitivity and Intensity." In this case, the "sensitivity" corresponds to the threshold TTDth of the time TTD, and the "strength" corresponds to the target value STd of the steering torque ST by the auto-steering. In the example illustrated in (A) of FIG. 3, "sensitivity and intensity" are "high". That is, a relatively large value is assigned to the threshold TTDth (first parameter) and the target value STd (second parameter) as "sensitivity and intensity".

ECU 10 terminates the display of the image Gn (shifts to the non-display status) at a time point to elapsed from the time point when the display of the image Gn is started and at a time point t1 when the time point Δt has reached the threshold value Δtn (for example, 30 seconds).

Simple Customization Function

Each time the driver presses the switch 24a in the period Tn during which the image Gn is displayed, the level of "sensitivity and intensity" of the driving assist function DAFn is changed to a level higher by one step than the present level. On the other hand, each time the driver presses the switch 24b within the period Tn, the level of "sensitivity and strength" of the driving assist function DAFn is changed to a level lower than the present level by one step.

For example, the driver presses the switch 24a within the time T1 in which the image G1 shown in (A) of FIG. 2 is displayed. Then, as illustrated in (B) of FIG. 2, ECU 10 changes the "sensitivity and strength" of the automated braking function (PCS) as the driving assist function DAF1 from "medium" to "high". Specifically, ECU 10 changes the value assigned to each of the threshold TTCth of the time TTC and the target value BFd of the braking force from a medium value to a relatively large value. As a result, the automatic braking (PCS) is more likely to be started (the start timing is earlier than this time) and the braking force BF of the next and subsequent automatic braking is further enhanced than this time, as compared with the case where the "sensitivity/strength" is "medium".

Further, for example, the driver presses the switch 24b within the time T2 during which the image G2 shown in (A) of FIG. 3 is displayed. Then, as illustrated in (B) of FIG. 3, ECU 10 changes the "sensitivity and strength" of the auto-pilot function (LDA) as the driving assist function DAF2 from "high" to "medium". Specifically, ECU 10 changes the value assigned to each of the threshold TTDth of the time TTD and the target value STd of the steering torque ST from a relatively large value to a medium value. As a result, the automatic steering is less likely to be started and the steering-torque ST in the next and subsequent automatic steering is weaker than in the present case, as compared with the case where the "sensitivity/strength" is "high".

When the "sensitivity and strength" are changed while the driving assist DA1 or the driving assist DA2 is being provided, the target value BFd or the target value STd may be changed from the time point.

Further, it is assumed that a plurality of driving assist DAn are provided in a superimposed manner (a plurality of driving assist function DAFn are activated in a superimposed manner), so that the period Tn corresponding to the respective driving assist DAn overlap. In the present embodiment, only the last (or first) provided driving assist DAn is set as an operation target of the information-providing function and the simple-customization function.

Figure 4:
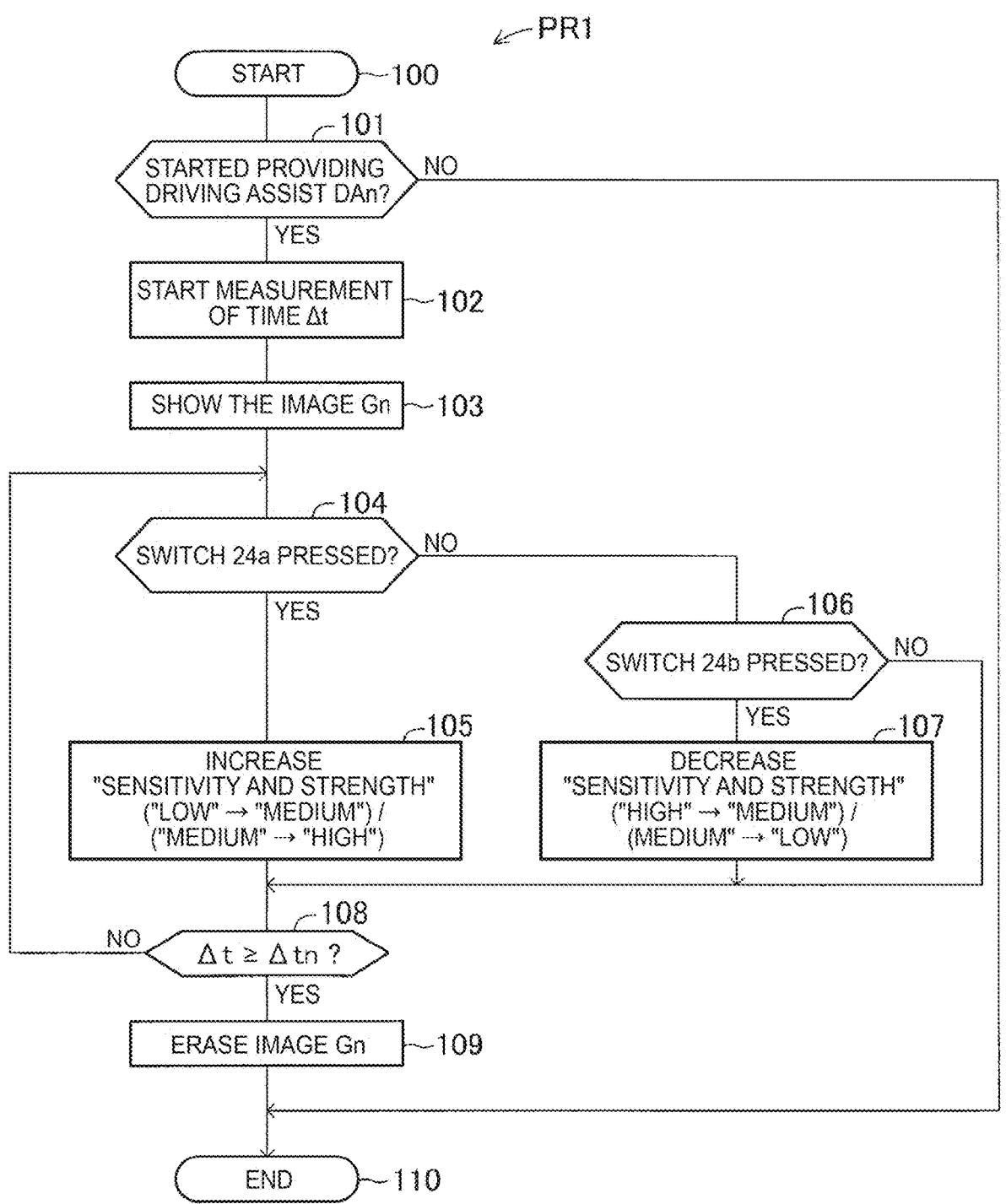
FIG. 4 is a flowchart of a program executed to realize an information providing function and a simple customization function.

Next, referring to FIG. 4, a program PR1 executed by a CPU 10a (hereinafter simply referred to as "CPU") in order to realize the information-providing function and the simple customizing function will be described. CPU starts executing the program PR1 at a predetermined cycle.

CPU starts executing the program PR1 from step 100, and advances the process to step 101.

In step 101, CPU determines whether or not the provision of the driving assist DAn is started (the driving assist function DAFn is activated). If CPU determines that the provision of the driving assist DAn has started (101: Yes), the process proceeds to step 102. On the other hand, if it is not determined that the provision of the driving assist DAn has started (101: No), CPU advances the process to step 110, and ends the program PR1 in step 110.

In step 102, CPU causes the timer 10d to start the measurement of the period Δt elapsed from the time to when the provision of the driving assist DAn is started. CPU then proceeds to step 103.

In step 103, CPU causes the notification device 30 to display the image Gn. CPU then proceeds to step 104.

CPU determines whether the switch 24a has been pressed in step 104. If CPU determines that the switch 24a has been pressed (104: Yes), the process proceeds to step 105. On the other hand, if it is not determined that the switch 24a has been pressed (104: No), CPU advances the process to step 106.

In step 105, CPU enhances the "sensitivity and strength" of the driving assist function DAFn by one step. When the "sensitivity and strength" of the driving assist function DAFn is the strongest, the "sensitivity and strength" is maintained. CPU then proceeds to step 108.

CPU determines whether the switch 24b has been pressed in step 106. If CPU determines that the switch 24b has been pressed (106: Yes), the process proceeds to step 107. On the other hand, if it is not determined that the switch 24b has been pressed (106: No), CPU advances the process to step 108.

In step 107, CPU attenuates the "sensitivity and strength" of the driving assist function DAFn by one step. When the "sensitivity and strength" of the driving assist function DAFn is weakest, the "sensitivity and strength" is maintained. CPU then proceeds to step 108.

In step 108, CPU determines whether the time Δt has reached the threshold Δtn (the time length of the period Tn). If CPU determines that the time Δt has reached the threshold Δtn (108: Yes), the process proceeds to step 109. On the other hand, if it is not determined that the period Δt has reached the threshold Δtn (108: No), CPU returns the process to step 104.

In step 109, CPU causes the notification device 30 to delete the image Gn. Next, CPU advances the process to step 110 and terminates executing the program PR1 in step 110.

Effect

In a predetermined period Tn after the provision of the driving assist DAn is started by the vehicle control device 1, an image Gn including the abbreviated name of the driving assist DAn and the setting information of the driving assist function DAFn (the present setting value regarding "sensitivity and intensity") is displayed. Then, the driving assist function DAFn is selected as a customization target, and the driver can customize the driving assist function DAFn by pressing the switch 24a or the switch 24b within the period Tn. As described above, according to the vehicle control device 1, the driver can easily customize the driving assist function DAFn.

The present disclosure is not limited to the above-described embodiments, and various modifications can be adopted within the scope of the present disclosure.

First Modification

A plurality of driving assist DAn are provided in a superimposed manner (a plurality of driving assist function DAFn are activated in a superimposed manner). As a result, all the driving assist DAn provided in a superimposed manner may be selected as the operation targets of the information-providing function and the simple-customization function in a scene in which the period Tn corresponding to the respective driving assist DAn overlap. When the driver presses the switch 24a or the switch 24b, the "sensitivity/strength" of all the selected driving assist DAn is collectively changed.

Second Modification

The present disclosure is unsuitable for a driving assist function DAFn in which a driver is difficult to distinguish and recognize a difference between an activated state and an inactivated state. In addition, it is preferable that the information-providing function and the simple customization function are not applied to the driving assist function DAFn (for example, the driving assist function DAFn that has been customized) that does not require customization. Therefore, instead of setting all the driving assist functions mounted on the own vehicle as the operation target of the information providing function and the simple customizing function, an arbitrary driving assist function may be excluded from the operation target of the information providing function and the simple customizing function. In the case of customizing the excluded driving assist function, the driver may use a conventional customization function.

Third Modification

As a simple customization function, only a function (or only a function to strengthen) that weakens the "sensitivity and strength" of the driving assist function DAFn may be provided. According to this configuration, since only the switch 24b (or the switch 24a) needs to be provided, the number of components of the vehicle control device 1 can be reduced. Here, the driver can increase (or decrease) the "sensitivity and strength" of the driving assist function DAFn by using the conventional customization function.

Fourth Modification

The vehicle control device 1 may have only an information providing function. That is, ECU 10 may only cause the notification device 30 to display the name (abbreviated name) of the driving assist function DAFn that is currently being activated or the driving assist function DAFn that was activated immediately before, and relatively detailed information about the driving assist function. The detailed information is, for example, an outline description of a function, a value assigned to various parameters, and the like. The notification device 30 is a predetermined area in the display device of the navigation system. At that point, the driving assist function DAFn may not be customizable. When the driver performs a predetermined operation in this state, the conventional customization function may be activated, and the driving assist function DAFn may be transitioned to a customizable state. According to this, the driver can acquire the driving assist DAn currently provided or the driving assist DAn provided immediately before without referring to the operation manual. Further, the driver can easily start the customization of the driving assist function DAFn by using the conventional customization function.

Fifth Modification

Instead of the switch 24, an input device having a touch panel, a lever, and a voice recognition function may be employed.

Sixth Modification

In the above-described embodiment, image Gn related to the provided driving assist DAn is displayed. Alternatively, or in addition, sounds representing the abbreviations and the rest of the driving assist DAn may be played.

Seventh Modification

In the above embodiment, the level of "sensitivity" and the level of "intensity" are the same, and when the driver presses the switch 24a or the switch 24b in the period Tn, the level of "sensitivity and intensity" is collectively changed. Alternatively, the levels of "sensitivity" and "intensity" may be individually settable. In this case, an operation device for changing the "sensitivity" and an operation device for changing the "intensity" are provided.

What is claimed is:

1. A vehicle control device comprising:
   an electronic control unit (ECU) including a processor and a timer;
   in-vehicle sensors configured to transmit sensor signals to the ECU, the in-vehicle sensors including
      a millimeter wave radar configured to calculate a distance between a host vehicle and a preceding vehicle,
      a camera configured to acquire image data in front of the host vehicle and calculate a relative speed value of the preceding vehicle with respect to the host vehicle based on the image data, and
      a speed sensor configured to detect a wheel speed value of the host vehicle;
   an image display device;
   a braking device configured to apply a braking force to wheels of the host vehicle; and
   a steering device including a first switch and a second switch that are integrated into a spoked portion of a steering wheel, wherein
   the processor is configured to
   start a first driving assist and cause the image display device to display a first image representing a first name of the first driving assist and a first indicator of first setting information related to the first driving assist at a same time, the first driving assist being executed by the processor in the order of (i) calculating a time to collision (TTC) required for the host vehicle to touch the preceding vehicle based on the sensor signals, (ii) determining whether the TTC is equal to or less than a TTC threshold, and (iii) controlling the braking device such that a first force value of the braking force matches a preset target force value of the braking force in response to the TTC being equal to or less than the TTC threshold, and the first setting information including the TTC threshold and the preset target force value, increase the first force value of the braking force in a case where the first switch is pressed by a driver of the host vehicle, cause the image display device to change the first indicator in response to the increased first force value of the braking force, decrease the first force value of the braking force in a case where the second switch is pressed by the driver, and cause the image display device to change the first indicator in response to the decreased first force value of the braking force.

2. The vehicle control device according to claim 1, wherein the processor is further configured to start a second driving assist and cause the image display device to display a second image representing a second name of the second driving assist and a second indicator of second setting information related to the second driving assist at a same time, the second driving assist being executed by the processor in the order of (i) calculating a time to deviation (TTD) indicating a time it takes for the host vehicle to deviate from a lane in which the host vehicle is travelling based on the sensor signals, (ii) determining whether the TTD is equal to or less than a TTD threshold, and (iii) controlling the steering device such that a first torque value of a steering torque matches a preset target torque value of the steering torque in response to the TTD being equal to or less than the TTD threshold, and the second setting information including the TTD threshold and the preset target torque value, increase the first torque value of the steering torque in a case where the first switch is pressed by the driver, cause the image display device to change the second indicator in response to the increased first torque value of the steering torque, decrease the first torque value of the steering torque in a case where the second switch is pressed by the driver, and cause the image display device to change the second indicator in response to the decreased first torque value of the steering torque.

* * * * *